US010810750B1

(12) United States Patent
Wang et al.

(10) Patent No.: US 10,810,750 B1
(45) Date of Patent: Oct. 20, 2020

(54) THREE-DIMENSIONAL SCANNING SYSTEM AND SCANNING METHOD THEREOF

(71) Applicant: SHINING 3D TECH CO., LTD., Zhejiang (CN)

(72) Inventors: Wenbin Wang, Zhejiang (CN); Zengyi Liu, Zhejiang (CN); Xiaobo Zhao, Zhejiang (CN)

(73) Assignee: Shining 3D Tech Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/094,210

(22) PCT Filed: Mar. 31, 2017

(86) PCT No.: PCT/CN2017/079059
§ 371 (c)(1),
(2) Date: Oct. 17, 2018

(87) PCT Pub. No.: WO2018/152929
PCT Pub. Date: Aug. 30, 2018

(30) Foreign Application Priority Data

Feb. 24, 2017 (CN) .......................... 2017 1 0105838

(51) Int. Cl.
*G06T 7/521* (2017.01)
*G06T 7/593* (2017.01)
*G01B 11/25* (2006.01)

(52) U.S. Cl.
CPC ............ *G06T 7/521* (2017.01); *G01B 11/254* (2013.01); *G06T 7/593* (2017.01); *G06T 2207/10028* (2013.01)

(58) Field of Classification Search
CPC ..................... G06T 7/521; G06T 7/593; G06T 2207/10028; G01B 11/254
See application file for complete search history.

(56) References Cited

U.S. PATENT DOCUMENTS 7,912,673 B2* 3/2011 Hebert ................. G01B 11/245
702/153
8,400,494 B2* 3/2013 Zalevsky ............. H04N 13/254
348/46
(Continued)

FOREIGN PATENT DOCUMENTS

CN 101089547 A 12/2007
CN 101608908 A 12/2009
(Continued)

OTHER PUBLICATIONS

M. Schaffer, M. Grosse, and R. Kowarschik, "High-speed pattern projection for three-dimensional shape measurement using laser speckles," Appl. Opt. 49, 3622-3629 (2010). (Year: 2010).*
(Continued)

*Primary Examiner* — Utpal D Shah
(74) *Attorney, Agent, or Firm* — Gang Yu

(57) ABSTRACT

The disclosure relates to a three-dimensional scanning system, the system comprises: a light source, configured to alternately project multiple speckle patterns and fringe patterns on the tested object in sequence; left and right cameras, configured to synchronously acquire left and right speckle images and left and right fringe images of the tested object; a speckle data and mark point data reconstruction module, configured to obtain three-dimensional speckle data and three-dimensional mark point data according to the speckle images; a fringe matching module, configured to back project the three-dimensional speckle data and the three-dimensional mark point data onto the left and right fringe images and guide fringes of the left and right fringe images for matching; and a three-dimensional reconstruction module, configured to reconstruct corresponding fringes matched with the left and right fringe images into the three-dimensional fringe point cloud data.

16 Claims, 3 Drawing Sheets

(56) References Cited

U.S. PATENT DOCUMENTS

| | | | |
|---|---|---|---|
| 9,319,660 B2* | 4/2016 | Liou | H04N 13/254 |
| 9,858,671 B2* | 1/2018 | Chen | G06T 7/521 |
| 10,152,800 B2* | 12/2018 | Zhang | G06T 7/593 |
| 2007/0206204 A1* | 9/2007 | Jia | G01B 11/2527 |
| | | | 356/604 |
| 2007/0211258 A1 | 9/2007 | Lee et al. | |
| 2014/0354681 A1* | 12/2014 | Xiong | G06T 7/00 |
| | | | 345/619 |
| 2017/0154436 A1* | 6/2017 | Zhang | G06T 7/593 |
| 2017/0251197 A1* | 8/2017 | Willomitzer | H04N 13/254 |
| 2020/0110025 A1* | 4/2020 | Yacoubian | B33Y 50/00 |
| 2020/0211197 A1* | 7/2020 | Zhang | G06T 7/13 |
| 2020/0219273 A1* | 7/2020 | Murukeshan | G06T 7/593 |

FOREIGN PATENT DOCUMENTS

| | | | | |
|---|---|---|---|---|
| CN | 101608908 A | * | 12/2009 | |
| CN | 101739717 A | | 6/2010 | |
| CN | 101794461 A | | 8/2010 | |
| CN | 103868524 A | | 6/2014 | |
| CN | 104132624 A | | 11/2014 | |
| CN | 104596439 A | | 5/2015 | |
| CN | 105203044 A | | 12/2015 | |
| CN | 105203044 A | * | 12/2015 | G01B 11/24 |
| CN | 105241397 A | | 1/2016 | |
| CN | 105928472 A | | 9/2016 | |
| CN | 108088391 A | * | 5/2018 | |
| JP | 2006528770 A | | 12/2006 | |
| JP | 2013061248 A | | 4/2013 | |
| WO | 2004097335 A | | 11/2004 | |
| WO | 2015199615 A | | 12/2015 | |

OTHER PUBLICATIONS

S Gai, F. Da, and X. Dai, "Novel 3D measurement system based on speckle and fringe pattern projection," Opt. Express 24, 17686-17697 (2016). (Year: 2016).*

Yueyi Zhang;etc <Unambiguous 3D measurement from speckle-embedded fringe>; (Applied Optics) Nov. 8, 2013; vol. 52, P7797-7805.

* cited by examiner

US 10,810,750 B1

THREE-DIMENSIONAL SCANNING SYSTEM AND SCANNING METHOD THEREOF

TECHNICAL FIELD

The embodiments of disclosure relate to a three-dimensional scanning system and a scanning method, and particularly relates to a three-dimensional digital imaging sensor for a handheld multi-fringe three-dimensional scanning system, a three-dimensional scanning system and a scanning method.

BACKGROUND

A three-dimensional digital technology is an emerging interdisciplinary field being actively researched throughout the world in recent years, and is widely applied to many fields of reverse engineering, cultural relic protection, industrial detection, virtual reality and the like. A handheld portable three-dimensional scanner is widely applied to the field of three-dimensional scanning due to its advantages of convenience and flexibility. A principle of an existing handheld three-dimensional scanner is mainly a structured-light-based active stereo vision manner, and multiple structured light modes can be used, for example, an infrared laser speckle, a Digital Light Processing (DLP) projection speckle and a simulated laser fringe and laser fringe for DLP projection. Among these structured light modes, the handheld three-dimensional scanner taking the simulated laser fringe and laser fringe for DLP projection as structured light may achieve highest accuracy and best scanning details.

A basic workflow of an example taking the simulated laser fringe and laser fringe for DLP projection as the structured light is as follows:

(1) planar fitting is performed on projected fringes;
(2) mark point extraction and fringe center extraction are performed according to an acquired fringe pattern;
(3) connected domain division is performed on a fringe center, and corresponding point matching is performed on the fringes on images of left and right cameras according to a plane equation;
(4) corresponding mark point centers on the images of the left and right cameras are searched by virtue of an epipolar line constraint relationship of the left and right cameras;
(5) three-dimensional reconstruction is performed on the matched corresponding fringes and corresponding mark point centers by adopting a three-dimensional reconstruction algorithm according to a calibration parameter of a scanning system; and
(6) mark point splicing and fringe three-dimensional point rotation translation are performed to implement handheld three-dimensional scanning.

However, corresponding fringe matching on the images of the left and right cameras in this scanning process is mainly based on a guidance of a light plane or fringe plane equation. And in this method, in a case that the number of the fringes is greater than 15, a matching error rate of the corresponding fringes on the images of the left and right cameras is remarkably increased, noise is further increased and accuracy of scanning data is reduced. In a case that the number of the fringes is smaller than 15, the scanning efficiency cannot be effectively improved. Therefore, an effective method for improving the scanning efficiency under the limitation of an intrinsic scanning frame rate is to increase the number of the fringes and simultaneously improve the fringe matching accuracy. In addition, mark points are required to implement splicing for scanning, a certain number of common mark points are required between every two frames, and a whole scanning model is required to be completely pasted.

SUMMARY

In view of this, it is necessary to provide a handheld multi-fringe three-dimensional scanning system and a scanning method thereof, so as to solve the problem of incapability of an existing handheld three-dimensional scanning system in combining high scanning efficiency and high scanning data accuracy and simultaneously make it unnecessary to splice mark points in a scanning process.

A three-dimensional scanning system is configured to acquire three-dimensional fringe point cloud data of a tested object and includes: a light source, configured to alternately project multiple speckle patterns and fringe patterns on the tested object in sequence; left and right cameras, configured to synchronously acquire left and right speckle images and left and right fringe images of the tested object; a speckle data and mark point data reconstruction module, configured to obtain three-dimensional speckle data and three-dimensional mark point data according to the speckle images; a fringe matching module, configured to back project the three-dimensional speckle data and the three-dimensional mark point data onto the left and right fringe images and guide fringes of the left and right fringe images for matching; and a three-dimensional reconstruction module, configured to reconstruct corresponding fringes matched with the left and right fringe images into the three-dimensional fringe point cloud data, wherein the left and right speckle images are acquired according to the speckle patterns and the left and right fringe images are acquired according to the fringe patterns.

In at least one alternative embodiment, the fringe patterns are natural light fringe patterns.

In at least one alternative embodiment, the number of the fringes in the fringe patterns is greater than 15.

In at least one alternative embodiment, the three-dimensional scanning system is a handheld three-dimensional scanning system.

In at least one alternative embodiment, the three-dimensional scanning system further includes a speckle splicing module, configured to perform Iterative Closest Point (ICP) splicing by virtue of a point cloud of a public area of front and rear frames of speckle data and calculate rotation translation matrixes R and T between the two frames.

In at least one alternative embodiment, the three-dimensional scanning system further includes a data fusion module, configured to cause the rotation translation matrixes R and T obtained by speckle splicing to act on the three-dimensional fringe point cloud data for fusion, thereby implementing three-dimensional scanning of the fringe images.

A three-dimensional scanning system is configured to acquire three-dimensional fringe point cloud data of a tested object and includes: a light source, configured to alternately project multiple speckle patterns and fringe patterns on the tested object in sequence; left and right cameras, configured to synchronously acquire left and right speckle images and left and right fringe images of the tested object; and a data processing unit, configured to obtain three-dimensional speckle data and three-dimensional mark point data according to the speckle images, simultaneously back project the three-dimensional speckle data and the three-dimensional mark point data onto the left and right fringe images, guide fringes of the left and right fringe images for matching and further reconstruct corresponding fringes matched with the left and right fringe images into the three-dimensional fringe point cloud data.

A three-dimensional scanning method includes the following steps:

(1) equipment construction: a three-dimensional digital imaging sensor consisting of left and right cameras and a light source is constructed;
(2) system calibration: the left and right cameras are calibrated to obtain calibration parameters;
(3) projection and image acquisition: speckle patterns and fringe patterns are alternately generated in sequence, a tested object is projected by virtue of the light source, the speckle patterns and the fringe patterns are modulated and deformed by a height of the tested object to generate modulated speckle patterns and fringe patterns, the left and right cameras synchronously acquire the modulated speckle patterns to obtain left and right speckle images, and the left and right cameras synchronously acquire the modulated fringe patterns to obtain left and right fringe images;
(4) three-dimensional speckle and mark point data reconstruction: three-dimensional reconstruction is performed according to the obtained left and right speckle images to obtain three-dimensional speckle data PtS and three-dimensional mark point data PtM;
(5) fringe matching: the three-dimensional speckle data PtS and the three-dimensional mark point data PtM are back projected onto the left and right fringe images, and the left and right fringe images are guided for matching; and
(6) three-dimensional reconstruction: for the matched corresponding fringes of the left and right fringe images, corresponding relationships of single points are searched by virtue of an epipolar line geometric constraint relationship of the left and right cameras, wherein the single points is in central line segments of the matched corresponding fringes, and then the corresponding points are reconstructed into three-dimensional fringe point cloud data according to the calibration parameters.

In at least one alternative embodiment, the system calibration further includes the following step: the left and right cameras are calibrated, thereby acquiring internal and external parameters of the cameras and a rotation translation matrix Mc corresponding to relative positions of the cameras.

In at least one alternative embodiment, the three-dimensional speckle and mark point data reconstruction further includes three-dimensional speckle data reconstruction steps: a 5×5~11×11 rectangular subgraph centered on a certain image coordinate point pi on the left speckle image is extracted on the left speckle image according to the obtained speckle images; a corresponding epipolar line of the right speckle image is calculated according to the calibration parameters, matrix subgraphs with the same size are extracted by taking all coordinate points (q1~qn) on the corresponding epipolar line of the right speckle image as centers, and correlation coefficients C1~Cn between the subgraph at pi of the left speckle image and all the subgraphs on the epipolar line of the right speckle image are calculated; magnitudes of the correlation coefficients are compared, the maximum correlation coefficient is defined to be Cmax, a correlation coefficient threshold value T is set, and in a case that Cmax is greater than T, it can be determined that a unique corresponding matched point of pi of the left camera on the right camera is pr; and all pixel coordinate points on the left speckle image are traversed to search corresponding matched points of the right speckle image according to the abovementioned method, and the corresponding points are reconstructed into the three-dimensional data PtS according to the calibration parameters.

In at least one alternative embodiment, the three-dimensional speckle and mark point data reconstruction further includes three-dimensional mark point data reconstruction steps: all mark point centers on the left and right speckle images are extracted according to the obtained speckle images; corresponding matched mark point center pairs on the left and right speckle images are searched according to an epipolar line constraint criterion; and corresponding points of the mark points are reconstructed into the three-dimensional mark point data PtM according to the calibration parameters.

In at least one alternative embodiment, the fringe matching further includes mark point back projection deviation compensation steps, comprising that mark point center extraction is performed on the left and right fringe images, and mark point pairs PtMultiCoor are recorded; the corresponding matched mark point center pairs on the left and right fringe images are searched according to the epipolar line constraint criterion; and the three-dimensional mark point data PtM on the speckle images is back projected onto the modulated left and right fringe images in sequence according to the respective internal calibration parameters of the left and right cameras, two-dimensional coordinate pairs PtMatchCoor are recorded, pixel coordinate deviations of the closest mark point center pairs, extracted on the fringe images, of each pair of back projected mark point image coordinates on the PtMatchCoor are calculated, mean values of the respective deviations on the left and right fringe images are calculated in sequence, and the mean value pixDivL of the pixel deviations of the left fringe image and the mean value pixDivR of the pixel deviations of the right fringe image are recorded.

In at least one alternative embodiment, the three-dimensional matching further includes the following steps: after reconstruction of the three-dimensional speckle data PtS and the corresponding three-dimensional mark point data PtM is completed, central line extraction is performed on the left and right fringe images; a connected domain of each central line is divided to form multiple independent line segments, and then the three-dimensional speckle data PtS and the corresponding three-dimensional mark point data PtM are back projected onto the left and right fringe images in sequence according to the respective calibration parameters of the left and right cameras; the mean value pixDivL of the pixel deviations of the left fringe image and the mean value pixDivR of the pixel deviations of the right fringe image are added to the back projected coordinates of the left and right fringe images in sequence to implement deviation compensation; back projected coordinate pairs subjected to the deviation compensation are numbered, each corresponding point having a corresponding sequence number, so as to form a lookup table corresponding to the left and right image coordinates of the fringes; and the sequence number corresponding to each point of each line segment of the fringes on the left fringe image is traversed, and the matched line segments of the fringes on the right fringe image can be directly found according to the lookup table, thereby implementing accurate matching of the line segments of the left and right fringe images.

In at least one alternative embodiment, the three-dimensional reconstruction further includes the following steps:

for the central line segments of the matched corresponding fringes of the left and right images, the corresponding relationships of the single points in the central line segments of the corresponding fringes are searched by virtue of the epipolar line geometric constraint relationship of the left and right cameras, and then the corresponding point pairs are reconstructed into the three-dimensional fringe point cloud data according to the calibration parameters of a system.

In at least one alternative embodiment, the method further includes a speckle splicing step: ICP splicing is performed on a point cloud of a public area of front and rear frames of speckle data, and rotation translation matrixes R and T between the two frames are calculated.

In at least one alternative embodiment, the method further includes a data fusion step: the rotation translation matrixes R and T obtained by speckle splicing are caused to act on the three-dimensional fringe point cloud data for fusion, thereby implementing three-dimensional scanning of the fringe images.

Compared with the prior art, the three-dimensional scanner and the scanning method thereof of the embodiments of disclosure have the following advantages: the three-dimensional speckle data and the three-dimensional mark point data are obtained through the speckle images of the tested object, then the three-dimensional speckle data and the three-dimensional mark point data are back projected onto the left and right fringe images and the fringes of the left and right fringe images are guided for matching, thereby obtaining the three-dimensional fringe point cloud data. Compared with a conventional three-dimensional scanner, the three-dimensional scanner has the following advantages: 1, fringe matching precision or accuracy is relatively high, so that scanning efficiency of the three-dimensional scanning system can be improved by increasing the number of the matched fringes; 2, real-time splicing can be implemented without any mark point; and 3, a fringe light plane is not required to be calibrated, that is, matching of the left and right images is not required to be guided by the light plane, so that a requirement on mounting precision of a relative position of hardware is relatively low, and system cost is reduced.

The abovementioned description is only a summary about the technical schemes of the embodiments of disclosure. For making the technical means of the disclosure be understood more clearly, the disclosure can be implemented according to the contents of the description. Moreover, for making the abovementioned and other purposes, characteristics and advantages of the disclosure more obvious and easier to understand, detailed descriptions will particularly be made below through embodiments in combination with the drawings.

BRIEF DESCRIPTION OF THE DRAWINGS

The embodiments of the disclosure will be described below in combination with the drawings, wherein.

DETAILED DESCRIPTION OF THE EMBODIMENTS

Specific embodiments of the disclosure will further be described below on the basis of the drawings in detail. It should be understood that the specific embodiments described here are only adopted as embodiments and not intended to limit the scope of protection of the disclosure.

Figure 1:
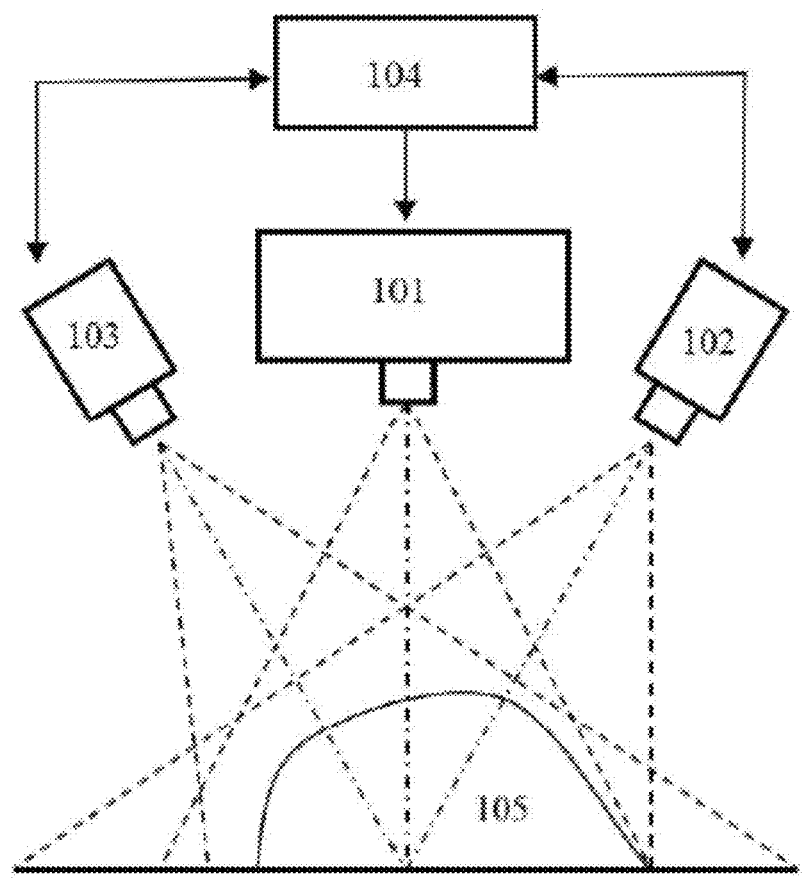
FIG. 1 is a structure schematic diagram of a three-dimensional scanning system provided by an embodiment of the disclosure.

Referring to FIG. 1, an embodiment of the disclosure provides a three-dimensional scanning system, which is configured to acquire or collect three-dimensional fringe point cloud data of a tested object 105. A type of the three-dimensional scanning system is not limited, comprising a fixed three-dimensional scanning system or a handheld three-dimensional scanning system, and in an embodiment of the disclosure, the three-dimensional scanning system is a handheld multi-fringe binocular three-dimensional scanning system. It can be understood that, in a case that the three-dimensional scanning system is the handheld multi-fringe binocular three-dimensional scanning system, errors may exist in images obtained in different time buckets in a working process due to jitter.

The three-dimensional scanning system includes a light source 101, a left camera 102, a right camera 103 and a data processing unit 104. Relative positions between the light source 101, the left camera 102 and the right camera 103 are not limited as long as the tested object 105 can be projected or acquired. Positions between the light source 101, the left camera 102 and the right camera 103 are relatively fixed during work. In an embodiment of the disclosure, the light source 101 is set just between the left camera 102 and the right camera 103.

The light source 101 is configured to alternately project multiple speckle patterns and fringe patterns on the tested object 105 in sequence. In some embodiments of the present application, alternate projection in sequence may refers to that a first projected pattern is a speckle pattern and the light source 101 is required to project one fringe pattern or multiple fringe patterns between every two speckle patterns, in some embodiments of the present application, the alternate projection in sequence also refers to that the following project process is repeated: one or more speckle patterns are projected first, then one or more fringe patterns are projected. And vice versa, one or more speckle patterns are required to be projected between every two fringe patterns and the first pattern is a speckle pattern. The light source 101 includes a laser, a projector or other light sources, and in a case that the light source 101 is a projector, the projector is a digital projector. The fringe patterns include simulated laser fringe patterns, laser fringe patterns, or other fringe patterns and the like. In an embodiment of the disclosure, the light source 101 is a projector and the fringe patterns are natural light fringe patterns. Compared with laser fringe patterns, the natural light fringe patterns are harmless to human eyes and black edge parts are prevented from being excessively bright during projection to mark points, so that accurate extraction of mark point centers may be improved, and splicing accuracy may be further improved. The number of fringes projected by the light source 101 is not limited but is usually required to be greater than 15, for improving scanning efficiency. In some embodiments of the disclosure, the number of the fringes is greater than 80.

The left camera 102 and the right camera 103 are configured to synchronously acquire left and right speckle images and left and right fringe images of the tested object 105. Types of the left and right cameras 102 and 103 are not limited as long as two-dimensional images of the tested object 105 may be obtained. It can be understood that, since the speckle patterns and the fringe patterns projected onto the tested object 105 by the light source 101 are modulated and deformed by a height of the tested object 105 to generate modulated speckle patterns and fringe patterns, the left and right cameras 102 and 103 acquire the modulated fringe patterns to obtain the left and right speckle images and the left and right fringe images.

The data processing unit 104 is configured to obtain three-dimensional speckle data and three-dimensional mark point data according to the speckle images, simultaneously back project the three-dimensional speckle data and the three-dimensional mark point data onto the left and right fringe images, guide fringes of the left and right fringe images for matching and further reconstruct corresponding fringes matched with the left and right fringe images into the three-dimensional fringe point cloud data.

Specifically, the data processing unit 104 includes a speckle data and mark point data reconstruction module, a fringe matching module and a three-dimensional reconstruction module. The speckle data and mark point data reconstruction module is configured to obtain the three-dimensional speckle data and three-dimensional mark point data according to the speckle images. The fringe matching module is configured to back project the three-dimensional speckle data and the three-dimensional mark point data onto the left and right fringe images and guide the fringes of the left and right fringe images for matching. The three-dimensional reconstruction module is configured to reconstruct corresponding fringes matched with the left and right fringe images into the three-dimensional fringe point cloud data. The three-dimensional reconstruction module is configured to, for the matched corresponding fringes of the left and right fringe images, search corresponding relationships of single points in central line segments of the corresponding fringes by virtue of an epipolar line geometric constraint relationship of the left and right cameras and then reconstruct the corresponding points into the three-dimensional fringe point cloud data according to calibration parameters. Of course, a manner or technology for reconstructing the three-dimensional fringe point cloud data by the three-dimensional reconstruction module is not limited as long as the matched left and right fringe images can be reconstructed into the three-dimensional fringe point cloud data.

Furthermore, the data processing unit 104 may further include a speckle splicing module and a data fusion module. The speckle splicing module is configured to perform ICP splicing by virtue of a point cloud of a public area of front and rear frames of speckle data and calculate rotation translation matrixes R and T between the two frames. The data fusion module is configured to cause the rotation translation matrixes R and T obtained by speckle splicing to act on the three-dimensional fringe point cloud data for fusion, thereby implementing three-dimensional scanning of the fringe images.

A scanning method for acquiring or collecting three-dimensional point cloud data of a tested object 105 by virtue of the abovementioned three-dimensional scanning system includes the following steps:

(1) Equipment construction: a three-dimensional digital imaging sensor consisting of left and right cameras and a light source is constructed.
(2) System calibration: the left and right cameras are calibrated to obtain calibration parameters.

The system calibration further includes the following step: the left and right cameras are calibrated, thereby acquiring internal and external parameters of the cameras and a rotation translation matrix Mc corresponding to relative positions of the cameras.

(3) Projection and image acquisition: speckle patterns and fringe patterns are alternately generated in sequence, the tested object is projected by virtue of the light source, the speckle patterns and the fringe patterns are modulated and deformed by a height of the tested object to generate modulated speckle patterns and fringe patterns, the left and right cameras synchronously acquire the modulated speckle patterns to obtain left and right speckle images, and the left and right cameras synchronously acquire the modulated fringe patterns to obtain left and right fringe images.
(4) Three-dimensional speckle and mark point data reconstruction: three-dimensional reconstruction is performed according to the obtained left and right speckle images to obtain three-dimensional speckle data PtS and three-dimensional mark point data PtM. Three-dimensional speckle data PtS reconstruction includes the following steps: a 5×5~11×11 rectangular subgraph centered on pi is extracted at a certain image coordinate point pi on the left speckle image according to the obtained speckle images; a corresponding epipolar line of the right speckle image is calculated according to the calibration parameters, matrix subgraphs with the same size are extracted by taking all coordinate points (q1~qn) on the corresponding epipolar line of the right speckle image as centers, and correlation coefficients C1~Cn between the subgraph at pi of the left speckle image and all the subgraphs on the epipolar line of the right speckle image are calculated; magnitudes of the correlation coefficients are compared, the maximum correlation coefficient is defined to be Cmax, a correlation coefficient threshold value T is set, and in a case that Cmax is greater than T, it can be determined that a unique corresponding matched point of pi of the left camera on the right camera is pr, and all pixel coordinate points on the left speckle image are traversed to search corresponding matched points of the right speckle image according to the abovementioned method, and the corresponding points are reconstructed into the three-dimensional data PtS according to the calibration parameters.

Three-dimensional mark point data PtM reconstruction includes the following steps: all mark point centers on the left and right speckle images are extracted according to the obtained speckle images; corresponding matched mark point center pairs on the left and right speckle images are searched according to an epipolar line constraint criterion; and corresponding points of the mark points are reconstructed into the three-dimensional mark point data PtM according to the calibration parameters.

(5) Fringe matching: the three-dimensional speckle data PtS and the three-dimensional mark point data PtM are back projected onto the left and right fringe images, and the left and right fringe images are guided for matching.

The fringe matching further includes mark point back projection deviation compensation steps, comprising that (a) mark point center extraction is performed on the left and right fringe images, and mark point pairs PtMultiCoor are recorded; (b) the corresponding matched mark point center pairs on the left and right fringe images are searched according to the epipolar line constraint criterion; (c) the three-dimensional mark point data PtM on the speckle images is back projected onto the modulated left and right fringe images in sequence according to the respective internal calibration parameters of the left and right cameras, two-dimensional coordinate pairs PtMatchCoor are recorded, pixel coordinate deviations of the closest mark point center pairs, extracted on the fringe images, of each pair of back projected mark point image coordinates on the PtMatchCoor are calculated, mean values of the respective deviations on the left and right fringe images are calculated in sequence, and the mean value pixDivL of the pixel deviations of the left fringe image and the mean value pixDivR of the pixel deviations of the right fringe image are recorded; (d) central line extraction is performed on the left and right fringe image, a connected domain of each central line is divided to form multiple independent line segments, and then the three-dimensional speckle data PtS and the corresponding three-dimensional mark point data PtM are back projected onto the left and right fringe images in sequence according to the respective calibration parameters of the left and right cameras; (e) the mean value pixDivL of the pixel deviations of the left fringe image and the mean value pixDivR of the pixel deviations of the right fringe image are added to the back projected coordinates of the left and right fringe images in sequence to implement deviation compensation; (f) back projected coordinate pairs subjected to the deviation compensation are numbered, each corresponding point having a corresponding sequence number, so as to form a lookup table corresponding to the left and right image coordinates of the fringes; and (g) the sequence number corresponding to each point of each line segment of the fringes on the left fringe image is traversed, and the matched line segments of the fringes on the right fringe image can be directly found according to the lookup table, thereby implementing accurate matching of the line segments of the left and right fringe images.

(6) Three-dimensional reconstruction: for the matched corresponding fringes of the left and right fringe images, corresponding relationships of single points in central line segments of the corresponding fringes are searched by virtue of an epipolar line geometric constraint relationship of the left and right cameras, and then the corresponding points are reconstructed into three-dimensional fringe point cloud data according to the calibration parameters. The three-dimensional reconstruction further includes the following steps: for the central line segments of the matched corresponding fringes of the left and right images, the corresponding relationships of the single points in the central line segments of the corresponding fringes are searched by virtue of the epipolar line geometric constraint relationship of the left and right cameras, and then the corresponding point pairs are reconstructed into the three-dimensional fringe point cloud data according to the calibration parameters of a system.

The three-dimensional scanning method further includes:

(7) speckle splicing: ICP splicing is performed on a point cloud of a public area of front and rear frames of speckle data, and rotation translation matrixes R and T between the two frames are calculated; and (8) data fusion: the rotation translation matrixes R and T obtained by speckle splicing are caused to act on the three-dimensional fringe point cloud data for fusion, thereby implementing three-dimensional scanning of the fringe images.

Compared with the prior art, the three-dimensional scanner and the scanning method thereof of the disclosure have the following advantages: the three-dimensional speckle data and the three-dimensional mark point data are obtained through the speckle images of the tested object, then the three-dimensional speckle data and the three-dimensional mark point data are back projected onto the left and right fringe images and the fringes of the left and right fringe images are guided for matching, thereby the three-dimensional fringe point cloud data are obtained. Compared with a conventional three-dimensional scanner, the three-dimensional scanner has the following advantages: 1, fringe matching precision or accuracy is relatively high, so that scanning efficiency of the three-dimensional scanning system may be improved by increasing the number of the matched fringes; 2, real-time splicing may be implemented without any mark point; and 3, a fringe light plane is not required to be calibrated, that is, matching of the left and right images is not required to be guided by the light plane, so that a requirement on mounting precision of a relative position of hardware is relatively low, and system cost is reduced.

For further elaborating the three-dimensional scanning system and the scanning method thereof of the disclosure, descriptions will be made below through a specific embodiment.

Referring to FIG. 1, a structure of a practically designed handheld multi-fringe binocular three-dimensional scanning system is shown in FIG. 1. 101 is a digital projector, 102 is a left camera, 103 is a right camera, 104 is a computer (data processing unit) and 105 is a tested object.

Internal parameters of the calibrated left camera are:

| K1 = [2271.084, | 0, | 645.632, |
|---|---|---|
| 0, | 2265.112, | 511.552, |
| 0, | 0, | 1]. |

Internal parameters of the calibrated right camera are:

| K1 = [2275.181, | 0, | 644.405, |
|---|---|---|
| 0, | 2270.321, | 510.053, |
| 0, | 0, | 1]. |

System structure parameters between the left camera and the right camera are:

R=[8.749981e−001, 6.547051e−003, 4.840819e−001, −2.904034e−003, 9.999615e−001, −8.274493e−003, −4.841175e−001, 5.834813e−003, 8.749835e−001], and T=[−1.778995e+002, −4.162821e−001, 5.074737e+001].

Figure 2:
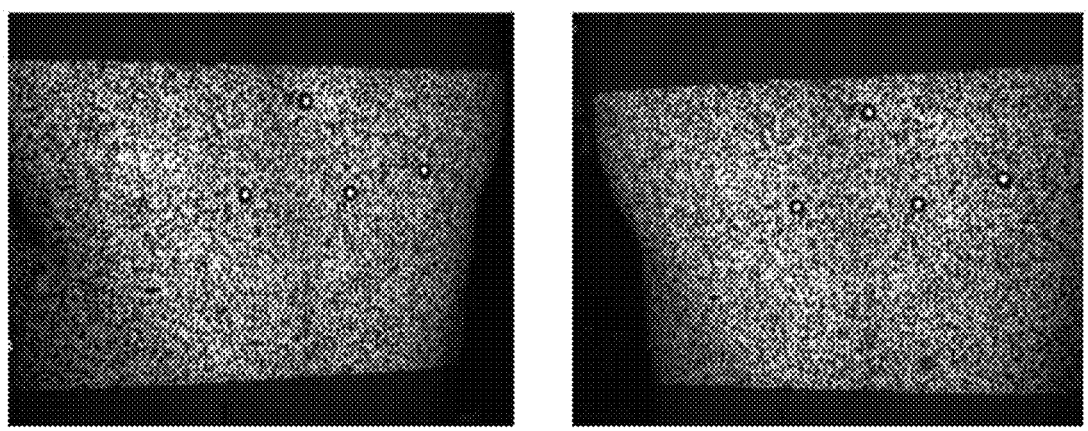
FIG. 2 shows left and right speckle patterns projected onto a tested object by a three-dimensional scanner in FIG. 1.
Figure 3:
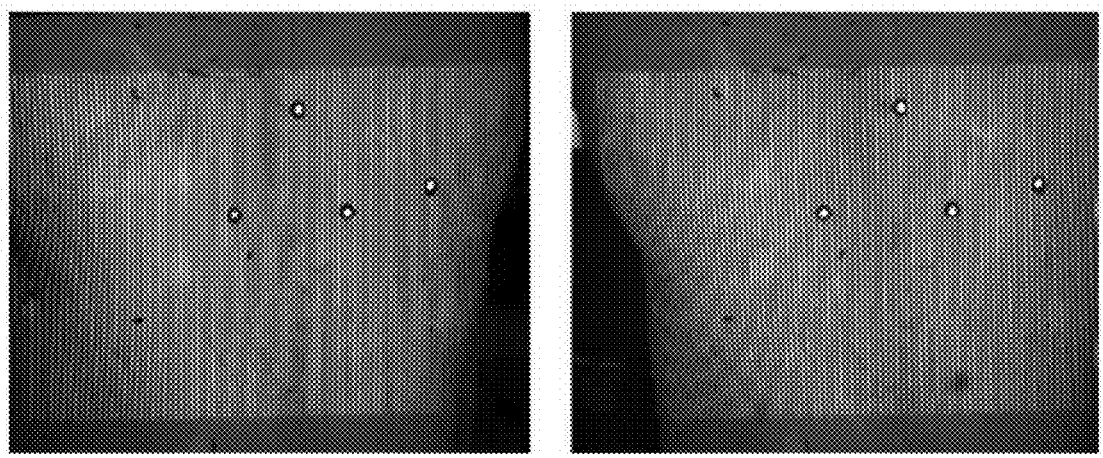
FIG. 3 shows left and right fringe images obtained by left and right cameras of the three-dimensional scanning system in FIG. 1.
Figure 4:
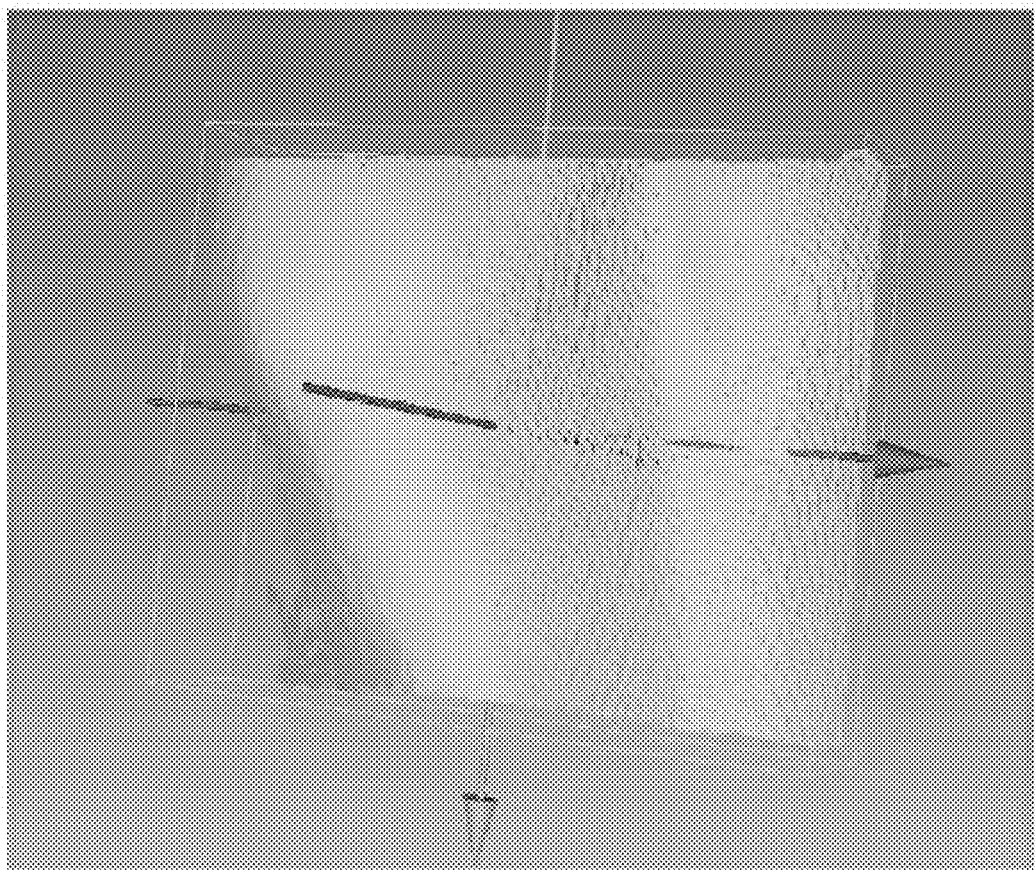
FIG. 4 shows three-dimensional speckle data obtained by performing three-dimensional reconstruction according to the speckle patterns in FIG. 1.
Figure 5:
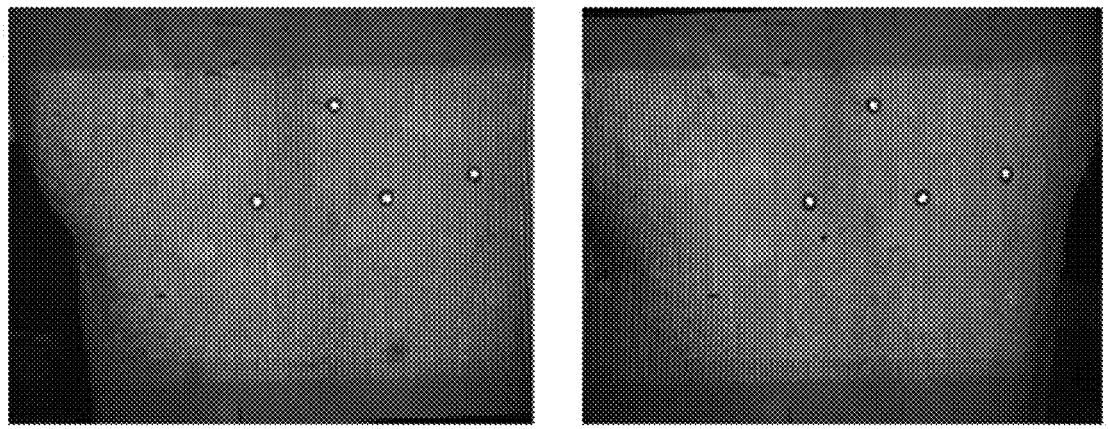
FIG. 5 shows back projections obtained by back projecting three-dimensional speckle data and three-dimensional mark point data onto the left and right fringe images in sequence.
Figure 6:
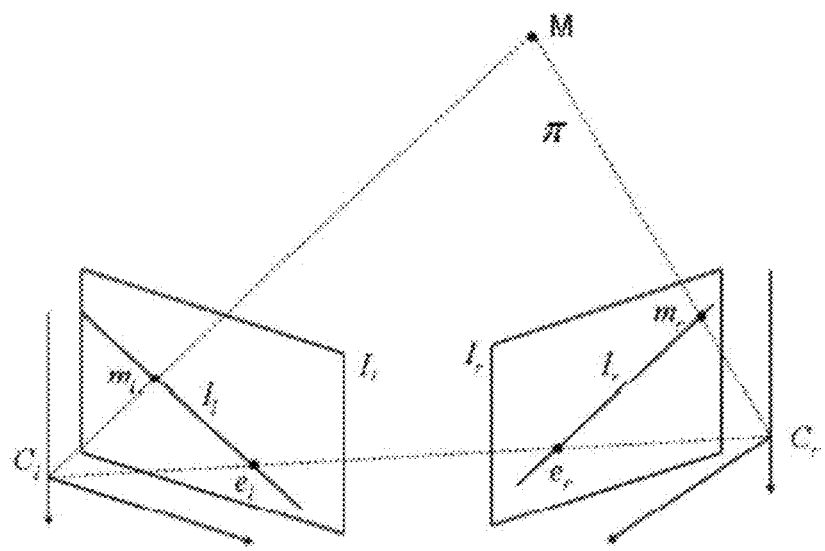
FIG. 6 is a schematic diagram of an epipolar line geometric constraint.

According to the steps described above, digital speckle patterns are projected onto the tested object 105, and the left and right cameras 102 and 103 synchronously acquire modulated speckle patterns to obtain left and right speckle images shown in FIG. 2. Then, digital multiline fringe patterns are projected, and the left and right cameras 102 and 103 synchronously acquire modulated fringe patterns to obtain left and right fringe images shown in FIG. 3. Three-dimensional reconstruction is performed according to the obtained digital speckle images to obtain three-dimensional speckle data shown in FIG. 4 and three-dimensional mark point data, meanwhile, the three-dimensional speckle data and the three-dimensional mark point data are back projected onto the left and right fringe images in sequence according to calibration parameters, as shown in FIG. 5, and sequence numbers are assigned to left and right corresponding points to form a sequence number lookup table. Fringe centers on the left and right fringe images are extracted, connected domain division is performed, and corresponding line segments of fringes are matched according to the sequence number lookup table. Corresponding point lookup is performed on matched line segment pairs according to an epipolar line geometric constraint relationship of the left and right cameras, as shown in FIG. 6, and then three-dimensional reconstruction is performed to generate three-dimensional fringe point cloud data according to the calibration parameters. The steps are repeated, real-time splicing is performed by virtue of the speckle data, and a splicing matrix is caused to act on the three-dimensional fringe point cloud data to implement real-time scanning of the fringe images.

Compared with the prior art, the three-dimensional scanner and the scanning method thereof of the embodiments of the disclosure have the following advantages: the three-dimensional speckle data and the three-dimensional mark point data are obtained through the speckle images of the tested object, then the three-dimensional speckle data and the three-dimensional mark point data are back projected onto the left and right fringe images and the fringes of the left and right fringe images are guided for matching, thereby obtaining the three-dimensional fringe point cloud data. Compared with a conventional three-dimensional scanner, the three-dimensional scanner has the following advantages: 1, fringe matching precision or accuracy is relatively high, so that scanning efficiency of the three-dimensional scanning system can be improved by increasing the number of the matched fringes; 2, real-time splicing can be implemented without any mark point; and 3, a fringe light plane is not required to be calibrated, that is, matching of the left and right images is not required to be guided by the light plane, so that a requirement on mounting precision of a relative position of hardware is relatively low, and system cost is reduced.

The above description is only the preferred embodiment of the disclosure and not intended to limit the disclosure. Any modifications, equivalent replacements, improvements and the like made within the principle of the disclosure shall fall within the scope of protection of the disclosure.

What is claimed is:

1. A three-dimensional scanning system, being configured to acquire three-dimensional fringe point cloud data of a tested object and comprising:
   a light source, configured to alternately project multiple speckle patterns and fringe patterns on the tested object in sequence;
   left and right cameras, configured to synchronously acquire left and right speckle images and left and right fringe images of the tested object, wherein the left and right speckle images are acquired according to the speckle patterns and the left and right fringe images are acquired according to the fringe patterns;
   a speckle data and mark point data reconstruction module, configured to obtain three-dimensional speckle data and three-dimensional mark point data according to the left and right speckle images;
   a fringe matching module, configured to back project the three-dimensional speckle data and the three-dimensional mark point data onto the left and right fringe images and guide fringes of the left and right fringe images for matching; and
   a three-dimensional reconstruction module, configured to reconstruct corresponding fringes matched with the left and right fringe images into the three-dimensional fringe point cloud data.

2. The three-dimensional scanning system as claimed in claim 1, wherein the fringe patterns are natural light fringe patterns.

3. The three-dimensional scanning system as claimed in 2, wherein a number of the fringes in the fringe patterns is greater than 15.

4. The three-dimensional scanning system as claimed in 1, wherein the three-dimensional scanning system is a handheld three-dimensional scanning system.

5. The three-dimensional scanning system as claimed in 1, further comprising: a speckle splicing module, configured to perform Iterative Closest Point (ICP) splicing by virtue of a point cloud of a public area of front and rear frames of speckle data and calculate rotation translation matrixes R and T between the front and rear frames.

6. The three-dimensional scanning system as claimed in 5, further comprising a data fusion module, configured to cause the rotation translation matrixes R and T obtained by speckle splicing to act on the three-dimensional fringe point cloud data for fusion, thereby implementing three-dimensional scanning of the fringe images.

7. A three-dimensional scanning system, being configured to acquire three-dimensional fringe point cloud data of a tested object and comprising:
   a light source, configured to alternately project multiple speckle patterns and fringe patterns on the tested object in sequence;
   left and right cameras, configured to synchronously acquire left and right speckle images and left and right fringe images of the tested object; and
   a data processing unit, configured to obtain three-dimensional speckle data and three-dimensional mark point data according to the speckle images, simultaneously back project the three-dimensional speckle data and the three-dimensional mark point data onto the left and right fringe images, guide fringes of the left and right fringe images for matching and further reconstruct corresponding fringes matched with the left and right fringe images into the three-dimensional fringe point cloud data.

8. A three-dimensional scanning method, comprising the following steps:
   (1) equipment construction: constructing a three-dimensional digital imaging sensor consisting of left and right cameras and a light source;
   (2) system calibration: calibrating the left and right cameras to obtain calibration parameters;
   (3) projection and image acquisition: alternately generating speckle patterns and fringe patterns in sequence, projecting a tested object by virtue of the light source, modulating and deforming the speckle patterns and the fringe patterns by a height of the tested object to generate modulated speckle patterns and fringe patterns,
   synchronously acquiring, by the left and right cameras, the modulated speckle patterns to obtain left and right speckle images, and synchronously acquiring, by the left and right cameras, the modulated fringe patterns to obtain left and right fringe images;

(4) three-dimensional speckle and mark point data reconstruction: performing three-dimensional reconstruction according to obtained left and right speckle images to obtain three-dimensional speckle data PtS and three-dimensional mark point data PtM;

(5) fringe matching: back projecting the three-dimensional speckle data PtS and the three-dimensional mark point data PtM onto the left and right fringe images, and guiding the left and right fringe images for matching; and (6) three-dimensional reconstruction: for matched corresponding fringes of the left and right fringe images, searching corresponding relationships of single points by virtue of an epipolar line geometric constraint relationship of the left and right cameras, wherein the single points is in central line segments of the matched corresponding fringes, and then reconstructing the corresponding points into three-dimensional fringe point cloud data according to the calibration parameters.

9. The three-dimensional scanning method as claimed in 8, wherein the system calibration further comprises the following step: calibrating the left and right cameras, thereby acquiring internal and external parameters of the cameras and a rotation translation matrix Mc corresponding to relative positions of the cameras.

10. The three-dimensional scanning method as claimed in 8, wherein the three-dimensional speckle and mark point data reconstruction further comprises three-dimensional speckle data reconstruction steps:

extracting a 5×5~11×11 rectangular subgraph centered on a certain image coordinate point pi on the left speckle image according to the obtained speckle images;

calculating a corresponding epipolar line of the right speckle image according to the calibration parameters, extracting matrix subgraphs with the same size by taking all coordinate points (q1~qn) on the corresponding epipolar line of the right speckle image as centers, and calculating correlation coefficients C1~Cn between the subgraph at pi of the left speckle image and all the subgraphs on the epipolar line of the right speckle image;

comparing magnitudes between the correlation coefficients, defining the maximum correlation coefficient to be Cmax, setting a correlation coefficient threshold value T, and in a case that Cmax is greater than T, determining that a unique corresponding matched point of pi of the left camera on the right camera is pr, and traversing all pixel coordinate points on the left speckle image to search corresponding matched points of the right speckle image according to the abovementioned method, and reconstructing the corresponding points into the three-dimensional data PtS according to the calibration parameters.

11. The three-dimensional scanning method as claimed in 10, wherein the three-dimensional speckle and mark point data reconstruction further comprises three-dimensional mark point data reconstruction steps:

extracting all mark point centers on the left and right speckle images according to the obtained speckle images;

searching corresponding matched mark point center pairs on the left and right speckle images according to an epipolar line constraint criterion; and reconstructing corresponding points of the mark points into the three-dimensional mark point data PtM according to the calibration parameters, wherein the corresponding points of the mark points is determined by mark point center pairs.

12. The three-dimensional scanning method as claimed in 11, wherein the fringe matching further comprises mark point back projection deviation compensation steps, comprising:

extracting mark point center on the left and right fringe images, and recording mark point pairs PtMultiCoor;

searching the corresponding matched mark point center pairs on the left and right fringe images according to the epipolar line constraint criterion; and back projecting the three-dimensional mark point data PtM on the speckle images onto modulated left and right fringe images in sequence according to the respective internal calibration parameters of the left and right cameras, recording two-dimensional coordinate pairs PtMatchCoor, calculating pixel coordinate deviations of closest mark point center pairs of each pair of back projected mark point image coordinates on the PtMatchCoor, wherein the closest mark point center pairs are extracted on the fringe images, calculating mean values of the respective deviations on the left and right fringe images in sequence, and recording the mean value pixDivL of the pixel deviations of the left fringe image and the mean value pixDivR of the pixel deviations of the right fringe image.

13. The three-dimensional scanning method as claimed in 12, wherein the three-dimensional matching further comprises the following steps:

after reconstruction of the three-dimensional speckle data PtS and the corresponding three-dimensional mark point data PtM is completed, extracting central line from the left and right fringe images;

dividing a connected domain of each central line to form multiple independent line segments, and then back projecting the three-dimensional speckle data PtS and the corresponding three-dimensional mark point data PtM onto the left and right fringe images in sequence according to the respective calibration parameters of the left and right cameras;

adding the mean value pixDivL of the pixel deviations of the left fringe image and the mean value pixDivR of the pixel deviations of the right fringe image to the back projected coordinates of the left and right fringe images in sequence to implement deviation compensation;

numbering back projected coordinate pairs subjected to deviation compensation, so as to form a lookup table corresponding to the left and right image coordinates of the fringes, wherein each corresponding point having a corresponding sequence number, and the each corresponding point refers to a point where back projected coordinate is located; and traversing the sequence number corresponding to each point of each line segment of the fringes on the left fringe image, and directly finding the matched line segments of the fringes on the right fringe image according to the lookup table, thereby implementing accurate matching of the line segments of the left and right fringe images.

14. The three-dimensional scanning method of claim 8, characterized in that the three-dimensional reconstruction further comprises the following steps: for the central line segments of the matched corresponding fringes of the left and right images, searching the corresponding relationships of the single points in the central line segments of the corresponding fringes by virtue of the epipolar line geometric constraint relationship of the left and right cameras, and then reconstructing the corresponding point pairs into the three-dimensional fringe point cloud data according to the calibration parameters of a system.

15. The three-dimensional scanning method as claimed in 8, comprising a speckle splicing step: performing Iterative Closest Point (ICP) splicing on a point cloud of a public area of front and rear frames of speckle data, and calculating rotation translation matrixes R and T between the two frames.

16. The three-dimensional scanning method as claimed in 14, further comprising a data fusion step causing the rotation translation matrixes R and T obtained by speckle splicing to act on the three-dimensional fringe point cloud data for fusion, thereby implementing three-dimensional scanning of the fringe images.

\* \* \* \* \*